United States Patent [19]

Takemae et al.

[11] Patent Number: 4,998,176
[45] Date of Patent: Mar. 5, 1991

[54] LINER FOR FLOPPY DISK AND PROCESS FOR PRODUCING THE SAME

[75] Inventors: Sigeru Takemae; Akira Aoki; Tatsuhiro Kato; Tadakatu Nozawa; Isamu Makihara; Masanori Ito, all of Nagoya, Japan

[73] Assignee: Mitsubishi Rayon Co., Ltd., Tokyo, Japan

[21] Appl. No.: 320,636

[22] Filed: Mar. 8, 1989

[51] Int. Cl.$^5$ .......................................... G11B 23/033
[52] U.S. Cl. .................................................. 360/133
[58] Field of Search ........................................ 360/133

[56] References Cited

U.S. PATENT DOCUMENTS 4,791,516 12/1988 Seto ..................................... 360/133

FOREIGN PATENT DOCUMENTS

| 57-94965 | 6/1982 | Japan . |
| 59-30272 | 2/1984 | Japan . |
| 59-160871 | 9/1984 | Japan . |
| 60-18871 | 1/1985 | Japan . |
| 61-187180 | 8/1986 | Japan . |
| 63-102085 | 5/1988 | Japan . |
| WO81/01905 | 7/1981 | World Int. Prop. O. . |

Primary Examiner—Robert S. Tupper
Attorney, Agent, or Firm—Armstrong, Nikaido, Marmelstein, Kubovcik & Murray

[57] ABSTRACT

A liner for a floppy disk which comprises a nonwoven fabric and a high molecular resin attached thereto, said nonwoven fabric containing thermoplastic fibers and being of a structure wherein a thermocompression-bonded part and a non compression-bonded part are present and the form of the fabric is maintained through the thermocompression-bonded part, and a process for producing a liner for a floppy disk which comprises partially thermocompression-bonding a sheet-formed fiber aggregate containing thermoplastic fibers and then attaching a high molecular resin thereto.

5 Claims, No Drawings

LINER FOR FLOPPY DISK AND PROCESS FOR PRODUCING THE SAME

FIELD OF THE INVENTION

The present invention relates to a novel liner comprising a fiber sheet used for lining a jacket for a floppy disk.

BACKGROUND OF THE INVENTION

A jacket used for a floppy disk is generally in the form of a bag formed of a sheet of high molecular resin such as vinyl chloride resin and ABS resin, and a liner formed of a fiber sheet is bonded to the inside thereof. The said liner formed of a fiber sheet is provided mainly for the purpose of interrupting the direct contact of the floppy disk with the resin sheet constituting the jacket proper, thereby to avoid the abrasion or damage of the floppy disk surface, and of cleaning the surface of the floppy disk. A variety of fiber sheets have already been proposed for such purposes. For example, Japanese Patent Application Kokai (Laid-open) No. 58-7705 (1983) discloses a nonwoven fabric formed of polyester fiber. Japanese Patent Application Kokai (Laid-open) No. 54-49115 (1979) discloses a nonwoven fabric formed of polypropylene fiber. Japanese Utility Model Application Kokai (Laid-open) No. 57-71280 (1982) discloses a nonwoven fabric formed of regenerated cellulose fiber. The methods used in these disclosures to stabilize the form of the nonwoven fabric involves melt-bonding the fibers to one another or adhesion-bonding the fibers to one another with an adhesive agent.

PROBLEMS TO BE SOLVED BY THE INVENTION

When a common fiber sheet prepared by known techniques is used as a liner for a floppy disk, lint will be formed owing to the falling off of adhesive agents or fibers, resulting in more frequent occurrence of error. In recent years, particularly, floppy disks are taking a big turn toward more minute size, higher density and higher speed of rotation, and the development of a high performance liner for a floppy disk capable of coping with such situation is eagerly awaited. On the other hand, a liner for a floppy disk prepared by the method comprising adhesion-bonding the fibers to one another with an adhesive agent is unsatisfactory in its cleaning effect although it produces less lint, and is hence unsatisfactory as a floppy disk liner.

MEANS FOR SOLVING THE PROBLEMS

The present invention discloses a liner for a floppy disk which comprises a nonwoven fabric and a high molecular resin attached thereto, said nonwoven fabric containing thermoplastic fibers and being of a structure wherein a thermocompression-bonded part and non compression-bonded part are present and the form of the fabric is maintained through the thermocompression-bonded part, and a process for producing a liner for a floppy disk which comprises partially thermocompression-bonding a sheet-formed fiber aggregate containing thermoplastic fibers and then attaching a high molecular resin thereto.

The present invention will now be discribed in detail below. The nonwoven fabric which contains thermoplastic fibers and is of a structure wherein a thermocompression-bonded part and a non compression-bonded part are present and the form of the fabric is maintained through the thermocompression-bonded part is prepared by making up thermoplastic fiber such as polyester, polypropylene and polyethylene fiber or a conjugated fiber thereof each alone, or a blend of thermoplastic fibers of different melting points, or a blend of a thermoplastic fiber with a non-thermoplastic fiber such as rayon and cotton, into the form of web with a carding engine, random webber etc. and then thermocompression-bonding the web by means of an embossing calender and the like.

The high molecular resin used in the present invention is preferably a water-soluble or water-dispersible one and includes, for example, acrylic resin, urethane resin, NBR resin, SBR resin, and vinyl acetate resin. These high molecular resins may be incorporated with modifiers such as crosslinking agents and surface smoothing agents to improve their properties. Although solvent-soluble or -dispersible resins may also be used with substantially the same effect obtained, they are disadvantageous from the viewpoint of cost as well as operation efficiency, safety and work environment.

The amount of the resin to be attached is 10% by weight or less, preferably in the range of 1 to 10% by weight. When the amount of attached resin exceeds 10% by weight, the resulting liner is unsuitable as a floppy disk liner because the liner becomes very hard and can injure the medium of the floppy disk or has a poor cleaning property.

As to the distribution of attached resin, it is preferable that the high molecular resin is present more in the non compression-bonded part than in the thermocompression-bonded part. This is because, since lint formation occurs predominantly at the non compression-bonded part and scarcely any formation is observed at the compression-bonded part, the high molecular resin should be attached to the non compression-bonded part. Adhesion of the high molecular resin to the thermocompression-bonded part exerts no effect in decreasing lint formation but merely makes the liner hard and is hence unfavorable.

The properties of the liner of the present invention is preferably as follows: number of lint particles developed having a particle diameter of not less than 10 $\mu$m: not more than 80/10 cm$^2$; thickness compressibility: not less than 30%; thickness recovery rate: not less than 80%; bending resistance: not more than 0.6 gf.cm.

The number of lint particles developed, thickness compressibility, thickness recovery rate, and bending resistance were determined by the following methods.

NUMBER OF LINT PARTICLES DEVELOPED

The sample was subjected to ultrasonic cleaning under the following conditions and the number of particles in the washings was counted by use of a Fine particle in liquid counter (mfd. by Rion Co.)
(a) Sample: liner of 127 mm × 127 mm
(b) Ultrasonic cleaner: Type VS-70R, mfd. by Velvo-Clear Co.
(c) Washing liquor ratio: 1:300 (pure water)
(d) Washing time: 10 minutes.

THICKNESS COMPRESSIBILITY

When the thickness of the liner under an initial load of 2 g/cm$^2$ is put as $t_0$ and that under a load of 40 g/cm$^2$ as $t_1$, thickness compressibility is calculated by the following equation.

$(t_0 - t_1)/t_0 \times 100$ (%).

THICKNESS RECOVERY RATE

The above-mentioned load of 40 g/cm² is removed and a load of 2 g/cm² is applied to the sample. When the thickness of the sample after a lapse of 1 minute under said load is put as $t_2$, the thickness recovery rate is calculated by the following equation.

$(t_2 - t_1)/(t_0 - t_1) \times 100$ (%).

BENDING RESISTANCE

This is determined according to JIS L-1096, Bending Resistance, Method B (slide method).

The liner for a floppy disk of the present invention is produced by attaching a high molecular resin to a nonwoven fabric which is prepared by partially thermocompression-bonding a sheet-formed fiber aggregate containing thermoplastic fibers and which is of a structure wherein a thermocompression-bonded part and a non compression-bonded part are present and the form of the fabric is maintained through the thermocompression-bonded part. When a nonwoven fabric is prepared by a conventional method, which comprises attaching a high molecular resin with a saturater etc. to a mere fiber sheet in which the form of the fabric is not maintained through the compression-bonded part, the resulting nonwoven fabric is unsuitable for a floppy disk liner because the liner becomes hard and can injure the medium of the floppy disk or shows a poor cleaning property.

The means used for attaching a high molecular resin to the nonwoven fabric of a structure wherein a thermocompression-bonded part and a non compression-bonded part are present and the form of the fabric is maintained through the thermocompression-bonded part include dipping, use of a coater, spraying, and the like. In any of these means, it is important to nip the fabric with a mangle or the like after the resin has been attached to the fabric, whereby the high molecular resin is attached not only to the surface of the non compression-bonded part but also to the interior of the non compression-bonded part uniformly, and the amount of resin attached to the compression-bonded part is reduced to a minimum and the necessary amount of the resin as a whole is reduced to a minimum. Resulting, a marked effect is exhibited in improving the cleaning property when the fabric is used as the liner for a floppy disk.

The present invention will be described further in detail below with reference to Examples. The cleaning property shown in the Examples was evaluated as follows.

METHOD OF EVALUATING CLEANING PROPERTY

A 5.¼" floppy disk (type 2HD) was used as the sample. A 0.1 ml portion of 5% liquid dispersion of polystyrene particles (having a particle diameter of 3 μm) is dropped onto the surface of the disk medium and then dried. Then the disk was subjected to an actual run test for 1 minute on a floppy disk driver and the surface of the medium after the test was visually examined to judge the cleaning property.

EXAMPLE 1, COMPARATIVE EXAMPLES 1 AND 2

Fifty (50) % by weight of a polyester fiber (1.5 d × 51 mm) and 50% by weight of a rayon fiber (1.5 d × 51 mm) were mixed and beaten, and then made up into webs with a flat card. The webs were then laminated to obtain a web weighting 30 g/m². It was then thermocompression-bonded by means of a calender of which the upper part was irregular and the lower part was flat at a temperature of 180° C. and a pressure of 10 kg/cm to obtain a nonwoven fabric having a thermocompression-bonded part and a non compression-bonded part. The fabric was dipped in a 100 g/l solution of Voncoat 3218 (an acrylic resin emulsion, mfd. by Dainippon Ink And Chemicals, Inc.) and then squeezed with a mangle so as to give a proportion of the attached high molecular resin solution of 100% by weight. The fabric was immediately dried at 150° C. for 1 minute, whereby a liner for a floppy disk to which 5% by weight of the high molecular resin had been attached as a whole was obtained.

Comparative Example 1 relates to the above-described nonwoven fabric having a thermocompression-bonded part and a non compression-bonded part but not treated with resin. In Comparative Example 2, a product was prepared which had not been subjected to the thermocompression-bonding using a calender and to which the above-mentioned resin had been attached by means of a saturator so as to give a nonwoven fabric strength necessary for a floppy disk liner. The proportion of the attached high molecular resin was 15% by weight.

The liners thus prepared were examined for the number of lint particles (number of lint particles of 10 μm or more in size per 10 cm²), cleaning property, and acceptance rate (%) in drop out test. The results obtained are shown in Table 1.

TABLE 1

|  | Number of lint particles | Compressibility (%) | Recovery rate (%) | Bending resistance (gf · cm) | Cleaning property | Acceptance rate in drop out test (%) |
| --- | --- | --- | --- | --- | --- | --- |
| Example 1 | 20 | 34.1 | 97.6 | 0.26 | Excellent | 100 |
| Comparative Example 1 | 620 | 30.8 | 97.5 | 0.17 | Poor | 90 |
| Comparative Example 2 | 79 | 23.0 | 98.6 | 0.35 | Poor | 87 |

The above results reveal that the liner for a floppy disk obtained according to the process of the present invention is excellent in both the number of lint and the cleaning property as compared with those of Comparative Examples 1 and 2.

EXAMPLE 2 AND COMPARATIVE EXAMPLE 3

A nonwoven fabric wherein a thermocompression-bonded part and a non compression-bonded part are present was prepared in the same manner as in Example 1. The fabric was dipped in a 100 g/l solution of Lacster 4700 c (a NBR emulsion, mfd. by Dainippon Ink and Chemicals, Inc.) and then squeezed with a mangle so as to give a proportion of the attached high molecular resin solution of 100% by weight. The fabric was immediately dried at 150° C. for 1 minute, whereby a liner for a floppy disk to which 5% by weight of the high molecular resin had been attached as a whole was obtained.

In Comparative Example 3 a liner was prepared wherein the proportion of the attached high molecular resin was changed to 20% by weight.

The liners thus prepared were examined for the number of lint and cleaning property, and the results are shown in Table 2.

TABLE 2

| | Number of lint particles | Compressibility (%) | Recovery rate (%) | Bending resistance (gf · cm) | Cleaning property | Acceptance rate in drop out test (%) |
|---|---|---|---|---|---|---|
| Example 2 | 20 | 34.1 | 97.6 | 0.26 | Excellent | 100 |
| Comparative Example 3 | 10 | 17.5 | 98.8 | 0.71 | poor | 85 |

The above results reveal that the liner obtained according to the process of the present invention is excellent in both the number of lint and the cleaning property as compared with that of Comparative Example 3.

EXAMPLE 3

Upon the both sides of a mixed web (70 μm in thickness) composed of 50% of a polyester fiber (4 d×51 mm) of a low melting point (130° C.) and 50% of a rayon fiber (1.5 d×51 mm), were placed mixed webs (each 70 μm in thickness) composed of 50% of a polyester fiber (1.5 d×51 mm) having a melting point of 255° C. and 50% of a rayon fiber (1.5 d×51 mm) in the form of a sandwich and the whole was partially thermocompression-bonded at a temperature of 180° C. and a pressure of 10 kg/cm. It was then dipped in a 100 g/l solution of Vancoat 3218 (an acrylic resin emulsion, mfd. by Dainippon Ink and Chemicals, Inc.) and squeezed with a mangle so as to give a proportion of the high-molecular resin of 100% by weight and immediately dried at 150° C. for 1 minute, whereby a liner containing 5% by weight of the high molecular resin attached thereto was obtained.

The liner thus obtained showed the following properties.

| | |
|---|---|
| Number of lint particles | 14 |
| Compressibility | 33.4% |
| Recovery rate | 96.7% |
| Bending resistance | 0.21 gf · cm |
| Cleaning property | Excellent |
| Acceptance rate in drop out test | 100% |

EFFECT OF THE INVENTION

The liner for a floppy disk of the present invention constructed as stated above gives a very low degree of lint formation which would cause errors in the floppy disk and has a good cleaning property required in a floppy disk liner. Thus, it is very useful as a liner for a floppy disk of high performance capable of coping with the recent trend of floppy disks toward more minute size, higher density and higher speed of rotation.

What is claimed is:

1. A liner for a floppy disk which comprises a nonwoven fabric and not more than 10% by weight of a high molecular weight resin attached thereto, said nonwoven fabric containing thermoplastic fibers and being of a structure wherein a thermocompression-bonded part and a non-compression-bonded part containing more of said high molecular weight resin than said thermocompression-bonded part, are present and the form of the fabric is maintained through the thermocompression-bonded part.

2. A liner for a floppy disk according to claim 1 wherein the high molecular weight resin to be attached is a water-soluble or a water-dispersible high molecular resin.

3. A liner for a floppy disk according to claim 1 wherein the number of lint developed having a particle diameter of not less than 10 μm is not more than 80/10 cm², the thickness compressibility is not less than 30%, the thickness recovery rate is not less than 80%, and the bending resistance is not more than 0.6 gf.cm.

4. A process for producing a liner for a floppy disk which comprises partially thermocompression-bonding a sheet-formed fiber aggregate containing thermoplastic fibers thereby producing a thermocompression-bonded part and a non thermocompression-bonded part, and then attaching, in a proportion of not more than 10% by weight, a high molecular weight resin thereto such that more of said resin is contained in said non thermocompression-bonded part than in said thermocompression-bonded part.

5. A process for producing a liner for a floppy disk according to claim 4 wherein the sheet-formed fiber aggregate is, after the high molecular weight resin has been attached thereto, nipped before drying.

* * * * *